(12) United States Patent
Auer et al.

(10) Patent No.: US 7,049,383 B2
(45) Date of Patent: May 23, 2006

(54) POLYISOBUTENE COMPOSITION

(75) Inventors: Heinz Auer, Neulussheim (DE); Dirk Borchers, Kapellen (BE); Thomas Wettling, Ekeren (BE)

(73) Assignee: BASF Aktiengesellschaft, Ludwigshafen (DE)

( * ) Notice: Subject to any disclaimer, the term of this patent is extended or adjusted under 35 U.S.C. 154(b) by 73 days.

(21) Appl. No.: 10/482,807

(22) PCT Filed: Jul. 2, 2002

(86) PCT No.: PCT/EP02/07305

§ 371 (c)(1),
(2), (4) Date: Jan. 5, 2004

(87) PCT Pub. No.: WO03/004540

PCT Pub. Date: Jan. 16, 2003

(65) Prior Publication Data

US 2004/0198937 A1     Oct. 7, 2004

(30) Foreign Application Priority Data

Jul. 4, 2001    (DE) ................................. 101 32 337

(51) Int. Cl.
*C08F 110/10*     (2006.01)
(52) U.S. Cl. ..................... 526/348.7; 526/237; 524/490
(58) Field of Classification Search ............. 526/348.7, 526/237; 524/490
See application file for complete search history.

(56) References Cited

U.S. PATENT DOCUMENTS

| | | | |
|---|---|---|---|
| 5,286,823 A | * | 2/1994 | Rath .......................... 526/237 |
| 5,408,018 A | | 4/1995 | Rath |
| 5,844,056 A | | 12/1998 | Kennedy et al. |
| 6,133,209 A | * | 10/2000 | Rath et al. ................... 508/448 |
| 6,407,186 B1 | | 6/2002 | Rath et al. |

FOREIGN PATENT DOCUMENTS

| | | |
|---|---|---|
| EP | 320 263 | 6/1989 |
| EP | 579 058 | 1/1994 |
| GB | 432 196 | 7/1935 |
| WO | 99/31151 | 6/1999 |
| WO | 00/08075 | 2/2000 |
| WO | 01/96421 | 12/2001 |

* cited by examiner

*Primary Examiner*—Caixia Lu
(74) *Attorney, Agent, or Firm*—Oblon, Spivak, McClelland, Maier & Neustadt, P.C.

(57) ABSTRACT

A polyisobutene composition having a global maximum of the differential molecular weight distribution curve at a molecular weight $M_{max}$ of from 3 500 to 8 000 is described, which comprises at least one local maximum at a molecular weight of from 112 to 560. The isobutene oligomers present act as flow improvers and boiling assistants. They are added to higher molecular weight isobutene polymers, preferably before or in the course of a distillation, for removing unconverted isobutene and/or an inert diluent.

11 Claims, 2 Drawing Sheets

POLYISOBUTENE COMPOSITION

BACKGROUND OF THE INVENTION

1. Field of the Invention

Figure 1:
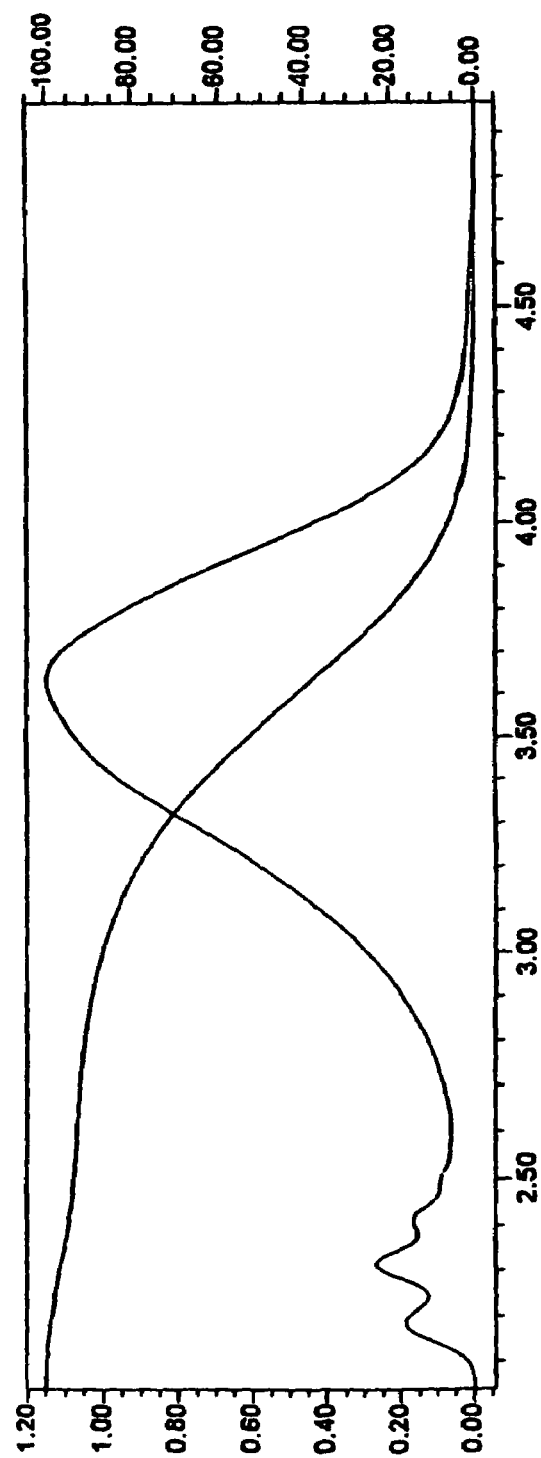

The present invention relates to a polyisobutene composition, a process for the preparation of polyisobutene and a process for reducing the viscosity of polyisobutenes.

2. Description of the Background

Polyisobutenes having a maximum of the molecular weight distribution of from 3 500 to 8 000 Dalton (corresponding roughly to a number average molecular weight of from 1 900 to 4 000) and preferably a high content of terminal vinylidene groups are desirable intermediates for the preparation of additives for lubricants and fuels. They are prepared by Lewis acid-catalyzed polymerization of isobutene. The Lewis acid catalyst used is frequently boron trifluoride, generally in combination with a compound capable of forming a complex with boron trifluoride. The polymerization is carried out in general in the presence of an inert diluent, such as n-hexane. As soon as the desired degree of polymerization has been reached, the catalyst is removed and/or deactivated and unconverted isobutene and the inert diluent are removed by being distilled off. Such a process is disclosed, for example, in U.S. Pat. No. 5,408,018.

The prior patent applications DE 199 48 947.5, DE 199 52 031.3, DE 199 52 030.5, DE 100 28 585.6 and DE 100 35 298.7 relate to improvements or advantageous embodiments of such processes.

In the preparation of polyisobutenes having a maximum of the molecular weight distribution of from 3 500 to 8 000, the high viscosity of these polyisobutenes presents problems when the unconverted isobutene and/or the inert diluent are distilled off. Thus, these polyisobutenes form extremely viscous boundary layers on the walls of containers or pipelines, which act as thermal insulator and hinder heat transfer. In order to distill off the final amounts of unconverted isobutene and/or inert diluent, it is therefore necessary to choose a high heating temperature, although there is the danger of thermal damage to the polyisobutene. In addition, the high viscosity of the material being distilled leads to the formation of a stubborn froth which adversely affects the quality of the distillative separation.

The viscosity of the polyisobutenes, which is high even at elevated temperatures, increases even further on cooling so that products which can scarcely be handled mechanically, i.e. can no longer be pumped and conveyed, are obtained at room temperature.

SUMMARY OF THE INVENTION

It is an object of the present invention to avoid the problems associated with the high viscosity of the polyisobutenes having a maximum of the molecular weight distribution of from 3 500 to 8 000 when the unconverted isobutene and/or the inert diluent are being distilled off and during the handling of the end products.

We have found that this object is achieved and that, surprisingly, low molecular weight isobutene oligomers have advantageous properties as flow improvers and boiling assistants for higher molecular weight polyisobutenes. The polyisobutene oligomers have a pronounced effect in reducing viscosity and ensuring a uniform boiling curve, even in low concentration. They moreover have the advantage that their chemical character resembles that of the higher molecular weight polyisobutenes, so that they can often remain in the product without their presence adversely affecting subsequent chemical reactions of the polyisobutenes. This is not necessarily the case with other assistants foreign to the system.

DETAILED DESCRIPTION OF THE PREFERRED EMBODIMENTS

In a first aspect, the present invention therefore relates to a polyisobutene composition having a global maximum of the differential molecular weight distribution curve at a molecular weight $M_{max}$ of from 3 500 to 8 000, in particular from 3 800 to 6 000, particularly preferably from 4 000 to 5 000, which comprises at least one local maximum at a molecular weight of from 112 to 560, in particular from 168 to 392.

Preferably, more than 80% by weight of the composition are formed by molecules having a molecular weight of from 0.25 to 2.5 times $M_{max}$. The area under the local maxima corresponds preferably to from 0.1 to 12, in particular from 0.2 to 10, % by weight of the composition. Area under the local maxima is considered to be the area enclosed by the actual distribution curve and an extrapolated distribution curve without local maxima (as can be extrapolated, for example, graphically or on the basis of a Schulz-Flory distribution from the curve above a molecular weight of 560) in the range of molecular weights from 112 to 560.

In a second aspect, the present invention relates to a process for the preparation of polyisobutene, in which isobutene is polymerized in the presence of a Lewis acid catalyst and of an inert diluent until an isobutene polymer having a maximum of the differential molecular weight distribution curve at a molecular weight $M_{max}$ of from 3 500 to 8 000 is obtained, the catalyst is separated off and/or deactivated and the unconverted isobutene and/or the diluent are separated off by distillation, wherein isobutene oligomers having a molecular weight of from 112 to 560, preferably from 168 to 392, are added to the isobutene polymer before or in the course of the distillation.

In a third aspect, the present invention relates to a process for reducing the viscosity of an isobutene polymer having a maximum of the differential molecular weight distribution curve at a molecular weight $M_{max}$ of from 3 500 to 8 000 by adding isobutene oligomers having a molecular weight of from 112 to 560, preferably from 168 to 392.

The isobutene oligomers are suitably added in an amount of from 0.1 to 12, preferably from 0.2 to 10, % by weight to the isobutene polymer.

Isobutene oligomers is to be understood as meaning molecules composed predominantly of repeating isobutene units and having from 8 to 40 carbon atoms (corresponding to a molecular weight of from 112 to 560), and isobutene polymers is to be understood as meaning those having at least 44 carbon atoms.

Where amounts in % by weight are stated in the present description and the claims, said amounts are based on the totality of the isobutene polymers and isobutene oligomers contained in a composition. The composition may also contain varying amounts of other components, such as solvents or diluents. A preferred embodiment of the novel polyisobutene composition is one which contains less than 0.5% by weight of components other than isobutene polymers and isobutene oligomers.

The differential molecular weight distribution curve is the plot of the weight of a molecular weight fraction against the molecular weight plotted along the abscissa. The size exclusion chromatography method, generally referred to as gel permeation chromatography, is suitable for determining the molecular weight distribution. The separation principle is based on the fact that polymeric molecules of different sizes can penetrate to different extents into the pores of a porous gel used as a separation phase. After appropriate calibration and detection by suitable methods, molecular weights and their weight fraction can be determined. Various detectors are suitable for detecting the molecular fractions separated by gel permeation. In addition to detectors which react to molecular absorption, e.g. IR and UV absorption, those which can detect substances independently of their absorption properties are also suitable. These include refractive index detectors, differential viscometers and laser scattered light detectors.

For the present purposes, a system consisting of two size exclusion chromatography separation columns connected in series and a refractive index detector is particularly suitable. Suitable measuring conditions are as follows:

1st column: 300 mm×7.8 mm; Ultrastyragel 105 C (from Waters)

2nd column: 300 mm×7.8 mm; Ultrastyragel 103 C (from Waters)

Eluent: Tetrahydrofuran

Flow rate: 1 ml/min

Column temperature: 45° C.

The curve in the region of low molecular weights up to about 600 can furthermore be determined by gas chromatography, for example using a gas chromatograph of the HP 6890 type from Hewlett-Packard with flame ionization detector and nonane as internal standard.

In the polymerization of isobutene in the presence of a Lewis acid catalyst, molecules having a uniform molecular weight are not obtained. Rather, a molecular weight distribution which has a visible maximum $M_{max}$ and drops off both toward higher and toward lower molecular weights is obtained. A novel polyisobutene composition is obtained by adding isobutene oligomers to an isobutene polymer having an $M_{max}$ of from 3 500 to 8 000, as obtained by polymerization of isobutene up to the desired degree of polymerization. The addition of the isobutene oligomers is advantageously effected in the course of the working-up, in particular before or during the distillation, of isobutene polymerization batches.

The polymerization of isobutene can be carried out continuously or batchwise but is preferably effected continuously. Processes for the continuous polymerization of isobutene in the presence of Lewis acid catalysts in inert diluents are known per se. In one continuous process, a part of the reaction mixture formed in the polymerization reactor is discharged continuously. An amount of starting materials, in this case isobutene or isobutene-containing hydrocarbon, which corresponds to the discharge is fed continuously to the polymerization reactor. The ratio of the amount of substance present in the polymerization reactor to the amount which is discharged is determined by the circulation/feed ratio, which as a rule is from 1 000:1 to 1:1, preferably from 500:1 to 5:1, in particular from 200:1 to 50:1 V/V in the continuous polymerization of isobutene to polyisobutene. The average residence time of the isobutene to be polymerized in the polymerization reactor may be from five seconds to several hours. Residence times of from 1 to 30, in particular from 2 to 20, minutes are particularly preferred.

The polymerization of the isobutene is effected in the conventional reactors, such as stirred kettles, tubular reactors, tube-bundle reactors and loop reactors, loop reactors, i.e. tubular or tube-bundle reactors having stirred kettle characteristics, being preferred. Tubular reactors having tube cross-sections which lead to turbulence in regions are particularly advantageous.

The polymerization is carried out as a rule at a polymerization temperature of from −60° C. to +40° C., preferably below 0° C., particularly preferably from −30° C. to 0° C., especially from −25° C. to −5° C. The heat of polymerization is accordingly removed with the aid of a cooling apparatus. This may be operated, for example, with liquid ammonia as coolant. Another possibility for removing the heat of polymerization is evaporative cooling. Here, the heat liberated is removed by partial evaporation of the reaction mixture, for example of the isobutene and/or other readily volatile components of the isobutene feed or of a readily volatile diluent. Isothermal conditions are preferably employed, i.e. the temperature of the liquid reaction phase of the polymerization reactor has a steady-state value and changes only slightly, if at all, during the operation of the reactor.

The concentration of the isobutene in the liquid reaction phase is as a rule from 0.2 to 50, preferably from 0.5 to 20, % by weight, based on the liquid reaction phase.

Suitable starting materials are both isobutene itself and isobutene-containing $C_4$-hydrocarbon streams, for example refined $C_4$ fractions, $C_4$ cuts from isobutane dehydrogenation or $C_4$ cuts from steam crackers or FCC (fluid catalyzed cracking) crackers, provided that they have been substantially freed from 1,3-butadiene contained therein. Suitable $C_4$-hydrocarbon streams contain, as a rule, less than 500 ppm, preferably less than 200 ppm, of butadiene. The presence of 1-butene and cis- and trans-2-butene is substantially noncritical and does not lead to a decline in selectivity. Typically, the isobutene concentration in the $C_4$-hydrocarbon streams is from 20 to 70% by weight. When $C_4$ cuts are used as starting material, the hydrocarbons other than isobutene play the role of an inert diluent. The isobutene-containing feed may contain small amounts of contaminants, such as water, carboxylic acids or mineral acids, without there being any critical declines in yield or selectivity during the polymerization. It is expedient to avoid an accumulation of these impurities, by removing such pollutants from the isobutene-containing feed, for example by adsorption on solid adsorbents, such as active carbon, molecular sieves or ion exchangers.

Suitable inert diluents are those solvents or solvent mixtures which are inert to the reagents used. Suitable diluents are, for example, saturated hydrocarbons, such as butane, pentane, hexane, heptane or octane, e.g. n-hexane, isooctane or cyclopentane, halogenated hydrocarbons, such as methylene chloride, dichloromethane or trichloromethane, and mixtures of the abovementioned diluents, of which n-hexane is particularly preferred. Before they are used, the diluents are preferably freed from impurities such as water, carboxylic acids or mineral acids, for example by adsorption on solid adsorbents, such as active carbon, molecular sieves or ion exchangers.

A particularly preferred Lewis acid catalyst is boron trifluoride, preferably in combination with a cocatalyst. Gaseous boron trifluoride is expediently used, it being possible to use technical-grade boron trifluoride still containing small amounts of sulfur dioxide and $SiF_4$, but preferably highly pure boron trifluoride having a purity of about 99.5% by weight.

Suitable cocatalysts are as a rule oxygen-containing compounds which preferably have at least one divalent oxygen atom. Suitable oxygen-containing compounds in addition to water are organic compounds of up to 30 carbon atoms.

Examples of these are $C_1$–$C_{30}$-alkanols, $C_1$–$C_{30}$-cycloalkanols, $C_2$–$C_{10}$-diols, $C_1$–$C_{20}$-carboxylic acids, $C_4$–$C_{12}$-carboxylic anhydrides and $C_2$–$C_{20}$-dialkyl ethers. Among these, $C_1$–$C_{20}$-alkanols, in particular $C_1$–$C_4$-alkanols, are preferred and, if required, can be used together with $C_2$–$C_{20}$-dialkyl ethers.

Particularly preferred cocatalysts are monohydric secondary $C_3$–$C_{20}$-alkanols. Examples are isopropanol, 2-butanol, sec-pentanol, sec-hexanol, sec-heptanol, sec-octanol and the like. 2-Butanol and especially isopropanol are particularly preferably used.

The molar ratio of boron trifluoride to cocatalyst is preferably from 1:1 to 1:10, in particular from 1:1.1 to 1:5, particularly preferably from 1:1.2 to 1:2.5.

The concentration of the Lewis acid catalyst in the reactor is as a rule from 0.01 to 1, in particular from 0.02 to 0.7, particularly preferably from 0.03 to 0.5, % by weight, based on the liquid reaction phase.

The isobutene polymer generally contains more than 60, in particular more than 80, mol % of terminal vinylidene groups. The dispersity $M_w/M_n$ is preferably not more than 2.0, in particular not more than 1.9.

After the desired degree of polymerization has been reached, the catalyst is separated off and/or deactivated and the polymerization is stopped in this manner. Deactivators such as water, alcohols, acetonitrile, ammonia or aqueous solutions of mineral bases or carbonates, which are added to the reaction mixture, can be used for the catalyst deactivation. Acidified aqueous solutions may also be used for this purpose. Instead of quantitatively deactivating the catalyst in the reaction mixture, it can either be quantitatively separated from the reaction mixture or partly separated from the reaction mixture and the remaining catalyst deactivated in the reaction mixture. Advantageously, the catalyst is removed according to the description in WO 99/31151.

For separating the catalyst from the reaction mixture, it is advisable to reduce the isobutene concentration beforehand to less than 2, preferably less than 1, in particular less than 0.5, % by weight, based on the reaction mixture. For separating off the catalyst, soluble boron trifluoride complex catalysts having limited solubility in the reaction mixture are preferably used and/or the reaction mixture is cooled to temperatures of, for example, from 5 to 30, preferably from 10 to 20, Kelvin below the reaction temperature.

By reducing the isobutene concentration and/or by cooling, the solubility of the catalyst in the reaction mixture decreases. The catalyst is obtained in the form of finely divided droplets which, as a rule, are rapidly transformed into a continuous phase. The catalyst phase has a higher density than the polymer solution and can be separated from the product phase with the aid of precipitators, separators or other apparatuses. If the catalyst is obtained only in the form of very finely divided droplets, conventional measures for increasing the droplet size, for example coalescing filters, can be used.

In the further course of the working-up, the reaction mixture is expediently subjected to one or more extractions—usually with water—for removing residual amounts of catalyst.

The reaction mixture is then freed from unconverted isobutene and/or inert diluent by distillation. The term distillation is to be understood in the widest sense and is intended to include all procedures in which the unconverted isobutene and/or the diluent are separated as gas or vapor from the polyisobutene obtained as residue. The gaseous isobutene and diluent are as a rule condensed and are recycled to the polymerization apparatus. Distillation is to be understood as meaning in particular isobaric heating with evaporation of isobutene and/or diluent or adiabatic flashing of the—expediently preheated—reaction mixture with formation of a gas phase and a liquid phase and combinations of adiabatic flashing and isobaric heating. The distillation is preferably effected using columns with internals having separation activities, such as bubble trays or packings.

The distillation can be carried out in one or more stages, for example in two stages. In the case of a multistage procedure, the main amount of the unconverted isobutene and/or of the diluent is removed in the first step and, if required, further steps, while the residues of the isobutene and diluent are distilled off in the final step. If the distillation is carried out in a plurality of stages, the novel addition of the isobutene oligomers is effected at least before or during the final distillation step. In the upstream distillation steps, the viscosity of the material being distilled is generally sufficiently low owing to the presence of comparatively large amounts of isobutene and/or diluent, so that the problems described at the outset generally do not occur in the upstream distillation steps. Nevertheless, the addition of the isobutene oligomers can of course be effected before or during the first distillation step or further distillation steps.

In the preferred embodiment, the substantial removal of the unconverted isobutene is effected in a first distillation by heating the reaction mixture and letting it down into a flash container, the reaction mixture, as a result of the reduction in pressure, separating into a gas phase containing the main amount of the unconverted isobutene (and possibly other low-boiling components) and of the inert diluent and a liquid phase containing a small amount of unconverted isobutene, inert diluent and the main amount of the polyisobutene. The pressure difference in the flash is, for example, from 5 to 25 bar. The residues of unconverted isobutene and inert diluent which remain in the liquid phase are then separated off by a second distillation. Isobutene oligomers are added before or in the course of the second distillation. The second distillation is expediently carried out in a column, the polyisobutene being obtained as bottom product. The bottom heating can be effected, for example, by means of a built-in heater or a circulation heat exchanger. The column feed is preferably preheated. The feed into the column can be effected by letting down by, for example, from 0.5 to 5 bar. The isobutene oligomers are expediently added to the column feed. Alternatively or additionally, the isobutene oligomers can be added on any desired column tray. The addition via a plurality of feed locations is of course also possible.

After removal of the unconverted isobutene and diluent by distillation is complete, the isobutene oligomers can, if desired, be removed again from the polyisobutene in a further distillation step, preferably under reduced pressure of, for example, less than 400 mbar.

The isobutene oligomers act as flow improvers and boiling assistants. They lead on the one hand to a dramatic reduction in the viscosity of the bottom product of the distillation and thus result in a uniform boiling curve. The isobutene oligomers lead to enhanced Brownian molecular movement and thus break up the viscous boundary layers of the high molecular weight polyisobutene which act as thermal insulators.

The desired activity as flow improver and boiling assistant is achieved only by using isobutene oligomers having a specific molecular weight. According to the invention, those having a molecular weight of from 112 to 560, preferably from 168 to 392, are used. Isobutene oligomers having a molecular weight lower than the stated one are undesirable because, owing to their low boiling point, they evaporate rapidly and do not display any activity as boiling assistants. With isobutene oligomers having a higher molecular weight, the desired activity is not achieved because their molecular weight does not differ sufficiently from that of the higher molecular weight isobutene polymers.

Isobutene oligomers of suitable molecular weight can be obtained, for example, by preparing low molecular weight isobutene polymer in a controlled manner in a separate polymerization step and, if required, obtaining a suitable fraction of isobutene oligomers therefrom by distillation.

Isobutene oligomers which are obtained in the preparation of isobutene polymers having an average molecular weight $M_{max}'$ of from 1 000 to 3 000 are particularly expediently used. Depending on the natural molecular weight distribution of these isobutene polymers (i.e. below the left rising slope of the distribution curve), isobutene oligomers are also formed and can be separated off and can be used as described.

A preferred embodiment of this aspect of the invention is a process in which
 a) isobutene is polymerized in the presence of a Lewis acid catalyst and, if required, of an inert diluent until a first isobutene polymer having an $M_{max}$, of from 1 000 to 3 000 is obtained, and the catalyst is separated off and/or deactivated,
 b) isobutene oligomers having a molecular weight of from 112 to 560 are separated from the first isobutene polymer,
 c) separately therefrom, isobutene is polymerized in the presence of a Lewis acid catalyst and of an inert diluent until a second isobutene polymer having an $M_{max}$ of from 3 500 to 8 000 is obtained, and the catalyst is separated off and/or deactivated, and
 d) the unconverted isobutene and/or the diluent are separated from the second isobutene polymer by distillation and the isobutene oligomers from step b) are added to the second isobutene polymer before or in the course of the distillation.

Thus, a first isobutene polymer having $M_{max}$, of about 2 000 and a second isobutene polymer having $M_{max}$ of about 4 200 can be prepared, for example, separately from one another, for example in two plants operated independently of one another or alternately in one plant. Isobutene oligomers having a molecular weight of, for example, from 168 to 392 are then separated from the first isobutene polymer and are then added as flow improvers and boiling assistants in the context of the present invention to the second isobutene polymer.

The separation of the isobutene oligomers from the first isobutene polymer is preferably effected by distillation under reduced pressure at, for example, less than 400 mbar. A two-stage separation is also suitable, a pressure of less than 400 mbar, e.g. about 200 mbar, being employed in a first stage and a pressure of less than 100 mbar, e.g. 20 mbar, being employed in a second stage. The temperature required for the separation is, as a rule, from 120 to 250° C.

Liquid ring pumps are particularly suitable for generating reduced pressure in the stated pressure range. In these pumps, a working liquid is present in an annular suction chamber. Owing to its rotation, an eccentrically mounted rotor produces a liquid ring. This results in the formation of a sickle-shaped free space which is divided into a plurality of chambers by the blades of the rotor. These chambers initially increase in size during the rotation of the rotor. Consequently, gas at low pressure is sucked into the chambers via appropriate orifices in the side plates. On further rotation of the rotor, the gas sucked in is compressed and is forced out of the pump, once again via orifices in the side plates. The working liquid used is often water. The use of water as working liquid in the present process is however disadvantageous since, as a rule, decomposition products or secondary products of the Lewis acid catalyst, e.g. organofluorine compounds, which were not completely removed in the preceding catalyst removal, are present in the material to be distilled. The organofluorine compounds may be hydrolyzed to hydrofluoric acid by water which is used as working liquid. This acid leads to considerable corrosion damage to the liquid ring pump. It is therefore preferable to use isobutene oligomers as working liquid instead of water. This also avoids the use of other working liquids which are foreign to the system, may enter the end product and may impair its quality.

After removal of the unconverted isobutene and of the diluent by distillation or after removal of the added isobutene oligomers, the polyisobutene obtained as bottom product is cooled from the distillation temperature to storage temperature by passing it, for example, through the pipe coils of a heat exchanger. Typical storage temperatures are from 40 to 140° C., generally from 80 to 140° C. Owing to the viscosity of the polyisobutene, the cooling takes a very long time in some cases. It has been found that the heat transfer is hindered in particular by laminar edge layers having an insulating effect. The cooling is expediently facilitated using pipelines, for example having a diameter of from 20 to 30 mm, which are provided with internals, for example static mixers, which destroy the laminar edge layers. SMX mixers from Sulzer are particularly suitable.

The examples which follow and attached figures illustrate the invention.

FIG. 1 shows the differential and cumulative molecular weight distribution curve of a novel polyisobutene composition. The logarithm to the base ten of the molecular weight is plotted along the abscissa. The frequency of the respective weight class in arbitrary units is plotted along the left ordinate and the % by weight of the cumulative distribution is plotted along the right ordinate. The differential curve has a global maximum at about 4 200. On the left rising slope, three local maxima are detectable at 168, 224 and 280. The area under the local maxima corresponds to about 10% by weight of the polyisobutene composition.

Figure 2:
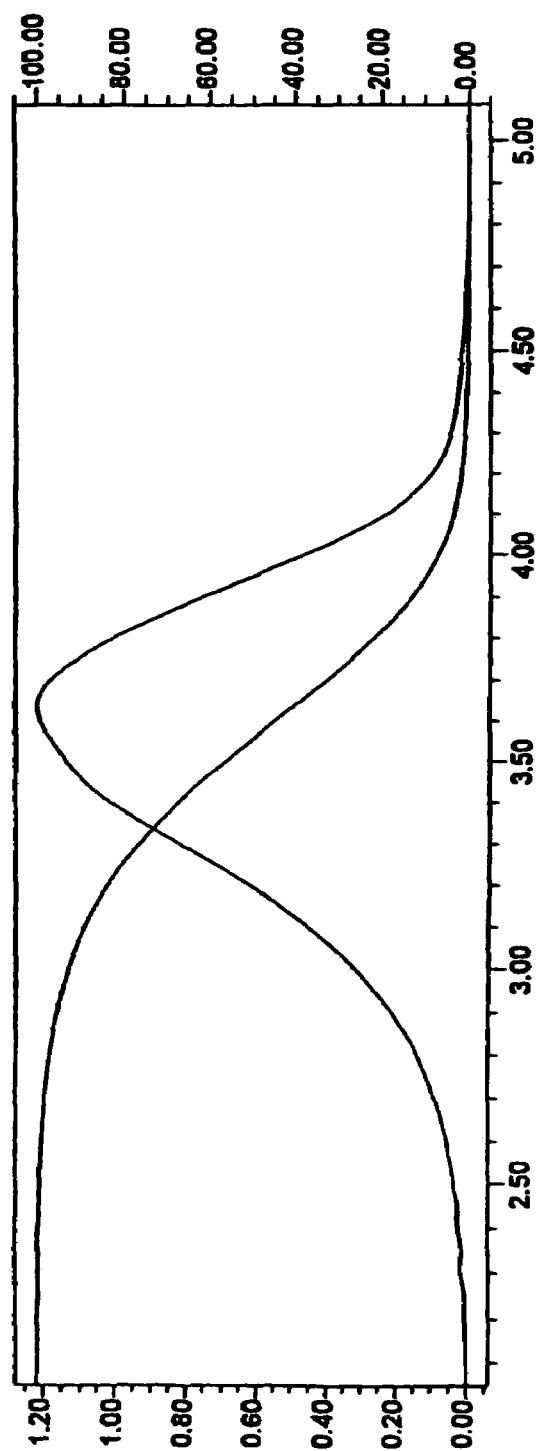

FIG. 2 shows the differential and cumulative molecular weight distribution curve of the polyisobutene composition from which the isobutene oligomers have been removed by means of distillation.

EXAMPLES

For the preparation of a polyisobutene, the procedure according to EP-A-628 575, example 1, was followed. The isobutene feed used corresponded to the following composition:
 Isobutane <1% by weight
 n-Butane <1% by weight
 1-Butene <1% by weight
 trans-2-Butene <1% by weight
 cis-2-Butene <1% by weight
 Isobutene 45% by weight
 Hexane 54% by weight
 Butadiene <50 ppm
 Water about 2 ppm In the course of one hour, 6 000 g of the above feed were fed to the suction side of a loop reactor which was equipped with an integrated circulation pump whose pipe diameter was 30 mm and whose volume was 1 000 ml. Boron trifluoride in an amount of 7.1 mmol/l of feed and 2-butanol in 1.6 times the molar amount, based on boron trifluoride, were added. The reactor was cooled so that the temperature in the reaction medium was −17° C. The average residence time of the reaction medium in the reactor was 6.6 minutes. The reaction discharge was thoroughly mixed with 2 000 g/h of water at 90° C., a temperature of from 35 to 45° C. resulting. The two phases formed were then separated. The upper phase (referred to below as crude product) consisted of polyisobutene, unconverted isobutene and hexane.

The crude product described above was passed via a heat exchanger, a temperature of 140° C. and a pressure of 14 bar resulting. The heated crude product was then let down into a flash container to 3.2 bar. The main amount of unconverted isobutene and hexane vaporized and was taken off as a gas phase at the top of the flash container. The liquid phase cooled to 100° C.

The liquid phase obtained was fed to a distillation column to remove the remaining unconverted isobutene and the remaining hexane. Different amounts of isobutene oligomers as boiling assistants and flow improvers or hexane (comparison) were added to the liquid phase to be distilled (cf. table below). The added isobutene oligomers had the following composition: 1.6% by weight of $C_8$-oligomer, 2.8% by weight of $C_{12}$-oligomer, 28.1% by weight of $C_{16}$-oligomer, 35.3% by weight of $C_{20}$-oligomer, 21.6% by weight of $C_{24}$-oligomer, 8.2% by weight of $C_{28}$-oligomer, 1.8% by weight of higher molecular weight components and 0.6% by weight of hexane.

The liquid phase (if desired with added boiling assistants and flow improvers) was heated with the aid of a heat exchanger, which was heated with steam at 22 bar and about 220° C. The heat transfer was dependent on the viscosity of the liquid phase, which in turn depended on the amount of added boiling assistants and flow improvers. Under otherwise identical conditions, a different temperature resulted in the heated mixture (cf. table below).

The heated liquid phase was introduced into a distillation column while letting down to 1 bar. A distillate having a boiling point of 72° C. passed over. The temperature of the bottom product of the distillation was maintained at 180° C. with the aid of a circulation heat exchanger (steam 22 bar; 220° C.). Depending on the added amount of boiling assistants and flow improvers, more or less foam formation occurred in the column. In comparative examples 1 and 5, the column operated very irregularly and jerkily and parts of the bottom product in the form of foam entered the distillate. The molecular weight $M_{max}$ of the polyisobutene obtained was about 4 200 in all examples.

| Example | Isobutene oligomers g/h | Temperature of heated mixture ° C. | Observation | $\overline{M}_N$ *) | Dispersity |
|---|---|---|---|---|---|
| 1 (Comparison) | 0 | 153 | much more viscous foam, jerky operation | 2 465 | 1.803 |
| 2 | 50 | 172 | little foam | 2 453 | 1.834 |
| 3 | 100 | 183 | little foam | 2 449 | 1.853 |
| 4 | 150 | 184 | little foam | 2 444 | 1.863 |
| 5 (Comparison) | Hexane: 100 | 187 | a lot of foam | 2 460 | 1.796 |

*) $\overline{M}_N$: Number average molecular weight

In order once more to remove the isobutene oligomers added as boiling assistants and flow improvers, the bottom product of the distillation was passed into a flash container which was under reduced pressure (200 mbar). The bottom product of the flash container was pumped continuously via a heat exchanger (steam 22 bar; about 220° C.) and kept at 180° C. The oligomeric components were thus substantially separated off and were then present in the distillate. The bottom product was the desired end product polyisobutene.

We claim:

1. A polyisobutene composition whose differential molecular weight distribution curve exhibits a global maximum at a molecular weight $M_{max}$ ranging from 3500 to 8000 and which exhibits at least one local maximum at a molecular weight ranging from 112 to 560 that is attributable to the presence of isobutene oligomer in the composition.

2. The polyisobutene composition as claimed in claim 1, wherein global maximum is at a molecular weight ranging from 3800 to 6000.

3. The polyisobutene composition as claimed in claim 1, wherein at least 80% by weight of the composition is constituted of molecules having molecular weights ranging from 0.25 to 2.5 times $M_{max}$.

4. The polyisobutene composition as claimed in claim 1, wherein the area under the at least one local maximum of the differential molecular weight distribution curve corresponds to from 0.1 to 12% by weight of the composition.

5. The polyisobutene composition as claimed in claim 4, wherein the area under the at least one local maximum of the differential molecular weight distribution curve corresponds to from 0.2 to 10% by weight of the composition.

6. The polyisobutene composition as claimed in claim 1, which exhibits at least one local maximum at a molecular weight ranging from 168 to 392.

7. A process for the preparation of polyisobutene, which comprises:
   polymerizing isobutene in the presence of a Lewis acid catalyst and, optionally, an inert diluent until an isobutene polymer whose differential molecular weight distribution curve exhibits a global maximum at a molecular weight $M_{max}$ ranging from 3500 to 8000 is obtained;
   separating and/or deactivating catalyst;
   separating isobutene, that has not polymerized, and diluent from the polymerized isobutene material by distillation; and
   adding isobutene oligomers that have molecular weights ranging from 112 to 560 to isobutene polymer before or during the distillation.

8. The process as claimed in claim 7, in which the Lewis acid catalyst comprises boron trifluoride.

9. The process as claimed in claim 7, wherein the polyisobutene produced contains more than 80 mol % of terminal vinylidene groups and the dispersity $M_w/M_n$ of the polymer is not more than 2.0.

10. The process as claimed in claim 7, comprising:
   a) polymerizing isobutene in the presence of a Lewis acid catalyst and an inert diluent until a first isobutene polymer whose differential molecular weight distribution curve exhibits a $M_{max}$ ranging from 1000 to 3000 is obtained;
   b) separating and/or deactivating the catalyst from the first isobutene polymer;
   c) separating isobutene oligomers having a molecular weight ranging from 112 to 560 from the first isobutene polymer;
   d) polymerizing isobutene in the presence of a Lewis acid catalyst and an inert diluent until a second isobutene polymer whose differential molecular weight distribution curve exhibits a $M_{max}$ ranging from 3500 to 8000 is obtained;
   e) separating and/or deactivating the catalyst from the second isobutene polymer;
   f) separating unconverted isobutene and/or diluent from the second isobutene polymer by distillation; and
   g) adding the isobutene oligomer obtained in step c) to the second isobutene polymer before or after distillation of the second isobutene polymer.

11. A process, comprising:
   reducing the viscosity of an isobutene polymer whose differential molecular weight distribution curve exhibits a global maximum at a molecular weight $M_{max}$ ranging from 3500 to 8000 by adding isobutene oligomers which exhibit at least one local maximum at a molecular weight ranging from 112 to 560 to the isobutene polymer.

* * * * *